United States Patent Office 3,823,047
Patented July 9, 1974

3,823,047
MANUFACTURING LAMINATES OF EXPANDED THERMOPLASTIC RESINS
Roberto Colombo, Turin, Italy, assignor to S.p.A. Lavorazione Materie Plastiche L.M.P. Turin, Italy
Filed July 26, 1972, Ser. No. 275,401
Claims priority, application Italy, Aug. 10, 1971, 6,987/71
Int. Cl. C09j 5/00
U.S. Cl. 156—322
2 Claims

ABSTRACT OF THE DISCLOSURE

A thermoplastic resin foam web and a backing sheet are laminated by previously accumulating in the sheet an amount of heat at a temperature sufficient for heat-bonding by continuously passing the two through a lamination zone. The latter comprises a melting region for the web and sheet and a region in which the laminating pressure is continued under controlled temperature conditions preventing both dispersion of heat from the exposed face of the backing sheet and delivery of external heat capable of softening the cellular structure of the foam web.

---

This invention concerns the lamination of webs of expanded thermoplastic resins (synthetic foams) with flexible backing sheets (e.g. paper, cardboard, textile fabric, aluminum sheet, plastic films).

This technical branch is taking on ever greater importance, mainly due to the fact that through combination of the intrinsic characteristics of the materials used, it has been possible to endow the laminate with a number of properties (mechanical resistance, thermic and acoustic insulation, watertightness, etc.) which are greatly called for in many applications.

Among the problems which have not, until now, been satisfactorily solved, there remain, maximum adhesion of the backing sheet to the foamed web, the greatest lightness compatible with the need for mechanical resistance, dimensional invariability in time, facility and economy in working. For example, if for lamination special adhesive materials are used, it is easy to obtain good adhesion between the backing sheet and the foam web, but it is certain that at the same time lightness of the laminate and economy in manufacture are prejudiced.

The main object of the invention is to offer an overall solution to the above-mentioned problems. Further objects and advantages will be evident from the following description.

The invention provides a method of manufacturing a laminate consisting of a web of rigid closed-cell foam of thermoplastic resin provided on at least one of its faces with a backing sheet, characterised in that the web and the sheet are joined together by direct adhesion by accumulating beforehand in the sheet a suitable quantity of heat at a temperature above that of fusion of the said thermoplastic resin and hence continuously bringing the sheet in pressure contact with the web of foam under rigid condition of its cells, so as to progressively bring about adhesion of the two through the superficial fusion of the foam web as a result of the heat accumulated in the sheet, without the use of additional adhesive means.

One special aspect of the method according to the invention consists therefore of the fact that, at the instant of bonding with the sheet, the web of expanded resin is at ambient temperature (or in any case less than that of softening) and is therefore rigid. In these circumstances, the said web is able to support without collapse relatively high bonding pressures which are desirable to bring about the required strong and uniform adhesion between the foam web and the sheet. Only a thin surface film (about 0.05 to 0.5 mm.) of the foam web will be fused by contact with the sheet, whilst the remaining thickness of the foam web will remain rigid and non-distorted.

It is advantageous to carry out the method by continuously, feeding the foam web and the sheet to the lamination zone from their respective rolls. In typical embodiment, the foamed web consists of foamed polystyrene with closed cells and, for example, a thickness of 1–10 mm., whilst the backing sheet consists of Kraft paper, of a weight, for example, of 100–150 gm./m.$^2$.

According to one particular feature of the invention the foam web is expanded, before lamination, by heating up to a temperature less than 10°–30° C. in relation to its softening temperature in order to achieve at the same time two effects; firstly, since a foam web with closed cells is used, one has an increase in thickness of the foam web as a result of expansion of the gas in the cells at the said temperature; in the case of polystyrene foam, the foam web can be heated to 100°–120° C., for example. The second effect consists of "annealing" of the foam web, that is in the elimination of the inner stresses latent in it, due to its process of manufacture, with the object of achieving the desired form stability of the laminate. As soon as, by heating, the foam web is increased in thickness to a convenient degree, then the greater thickness thus achieved is arrested by means of quick cooling, typically to at least 50° C., for example by means of jets of cool air, so that in any case the cells of the foam shall re-acquire their rigidity before the foam web is laminated to the backing sheet.

Polystyrene foam webs are typically manufactured by extruding a heat-softened pressurized mass of polystyrene having dissolved or dispersed therein a normally gaseous expanding agent, such as isopentane, for example. The decompression of the hot mass at its exit from the extrusion slit causes expansion of the expanding agent, hence formation of foam cells; the cellular structure is blocked by appropriately cooling the extruded web, the latter being also preferably drawn transversely and longitudinally before or during cooling in order to reduce its density. Foam webs obtained in this manner are preferentially used in the method according to this invention. However, according to the invention, a foam web obtained in the just described manner is preferably subjected to pressure stabilisation of its cells before being conveyed to the preheating stage described hereinbefore. This is because, as a result of cooling after extrusion, the gas pressure in the foam cells is reduced to below atmospheric, so that a subsequent immediate heating of the foam web will produce a little or no increase in thickness of the web, i.e. will not desirably lower the density of the foam. According to the invention, a foam web obtained as described hereinbefore is stored for at least 24 hours at atmospheric pressure or slightly superatmospheric pressure (e.g. 1.1 ata.). In these conditions atmospheric aid diffuses into the foam cells to an extent sufficient to establish in the cells atmospheric (or slightly superatmospheric) pressure, with the result that the subsequent heating of the web really produces a substantial increase in thickness of the web owing to a powerful heat-expansion pressure of the entrapped gas.

An important feature of this invention concerns the lamination zone. More particularly, in a continuous operation, the foam web is advantageously unrolled from a large-diameter roll and passed between a pair of pressure plates or rolls together with the backing sheet which unrolls from a supply roll and passes through a preheating zone in which the temperature of the sheet is raised to above the melting point of the foam resin. The problem is to effectively use, for bonding purposes, the heat accumulated in the backing sheet as differing from any additional heat which may be introduced into the foam web through the backing sheet from the pressure roll (laminating roll), for example. This is because both the amount and effects of such an additional heat are difficult to control. At the same time it is obviously desirable to recover for bonding purposes (melting of a surface film of the foam web) possibly all the effective heat accumulated in the backing sheet. Thus, according to the invention, the foam web and preheated backing sheet are heat-bonded together under a mechanically applied pressure while provision is made for blocking, at least in part, heat dispersion from the face of the backing sheet opposite that of contact. More particularly, the foam web and backing sheet are caused to meet each other under mechanical pressure in a "meeting region" through which the web and sheet are passed while the backing sheet is at its pre-heating temperature exceeding the melting point of the foam resin, and the pressure contact of the web and sheet is extended or repeated beyond the said meeting region by pressing the sheet against the foam web by means of at least one pressure-applying surface heated at a temperature not exceeding the softening point of the resin while the surface of the foam web in contact with the backing sheet is in sticky condition. In practical terms, the foam web and backing sheet may be caused to meet each other in a nip between a roll providing a support for the foam web and a heated roll pressing the backing sheet against the web, the heated roll being at the said pre-heating temperature and the linear speed of the laminate in the nip being at least 3 m./minute. Under these conditions practically no additional heat passes from the heated roll to the foam web through the backing sheet in the nip. The laminate leaves the nip in a condition in which the backing sheet has produced a superficial fusion of the foam web and sticks to the latter. During the interval in which the contact surface of the foam web is in its adhesively plastic condition the pressure contact is extended by passing the laminate between at least one further pair of compression rolls or plates, in which the backing sheet is pressed against the foam sheet by a roll or plate heated at a temperature below the melting point of the foam resin, preferably below the softening point of the resin. In this manner undesirable heat dispersion from the exposed face of the backing sheet is effectively prevented while at the same time no additional heat amount is introduced into the foam web capable of heat-softening the latter. Another embodiment of anti-dispersion means will be described hereinafter.

In the case of polystyrene foam, the backing sheet fed to the lamination zone may be preheated to 160–180° C., typicall to about 170° C., the material used for the sheet and its thickness being so selected that it will accumulate the necessary amount of heat. For example, a paper sheet of 100–150 g./m.$^2$ is in all cases suitable. Metal sheet, e.g. aluminium foil, sheets of textile fabrics and sheets of plastics having a sufficiently high melting point may also be used. Preferably, a backing sheet is laminated on each of the two faces of the foam web.

Figure 1:
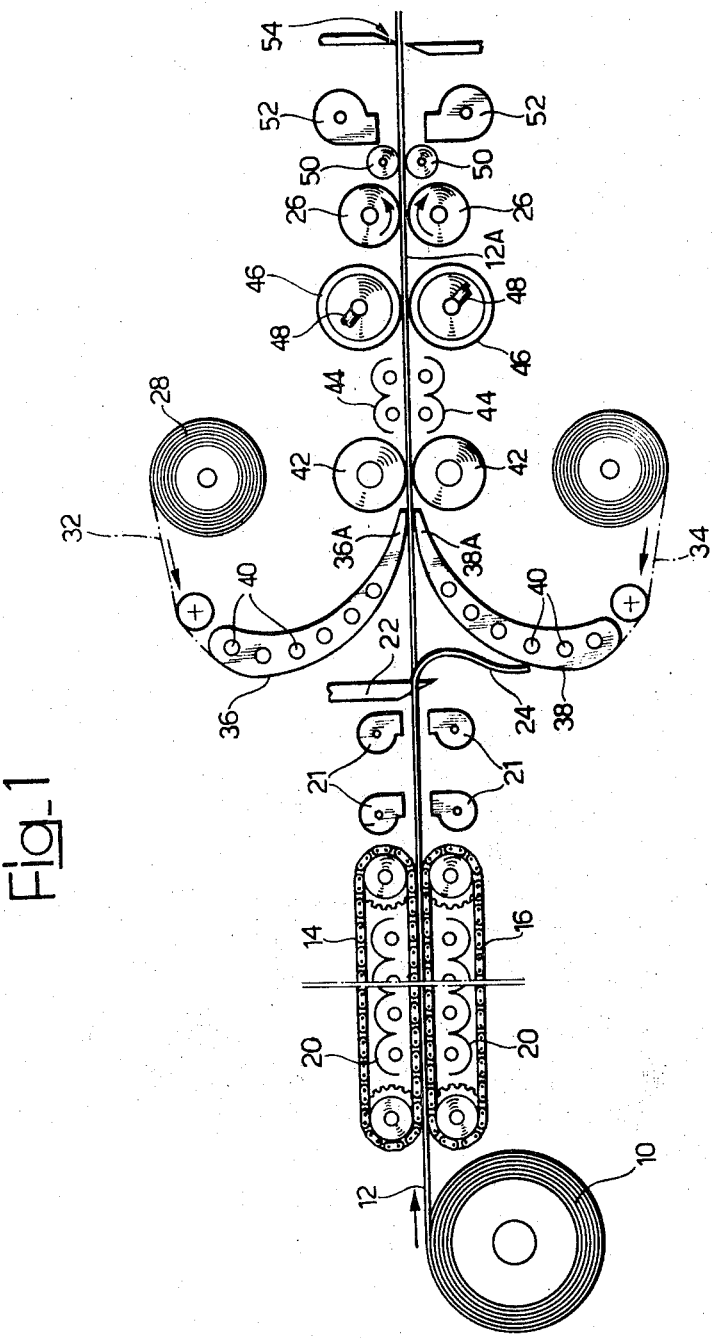
FIG. 1 is a diagrammatic side-view of an apparatus suitable for carrying out the method according to the invention.

In the drawings, numeral 10 indicates a roll of foamed polystyrene web of a width, say, of 140 cm., the web being indicated by numeral 12. In a practical embodiment of the method, the web 12 is preferably obtained by the following steps:

(a) In isopentane-permeated polystyreen melt is extruded under pressure through an annular slit to yield a tubular, foaming extrudate;

(b) A length of the tubular extrudate adjacent the extrusion slit is inflated or otherwise expanded to a diameter 3–10 times (preferably about 5 times) larger than its original diameter and is longitudinally drawn at a stretch-rate of 2:1 to 6:1, preferably 4:1, during cooling to room temperature;

(c) The longitudinally and transversely drawn extrudate obtained as above is continuously slit along a generatrix, open to flat configuration and relatively loosely wound on a reel;

(d) The roll of foam web obtained in (c) is stored at atmospheric pressure for at least 24 hours.

Figure 2:
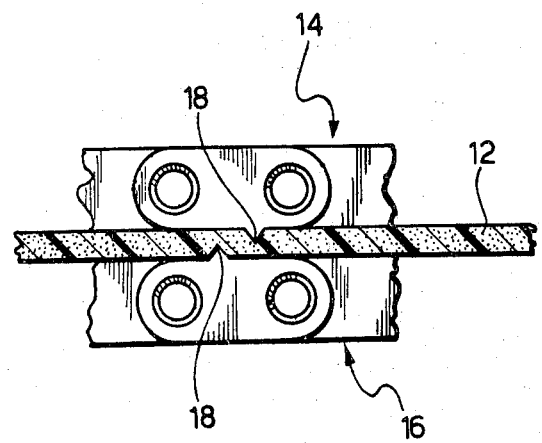
FIGS. 2 and 3 show, in cross-sectional view, two details of the apparatus.

The web 12 unrolls from the roll 10 under the action of two mutually parallel pairs of chain entrainers 14, 16, acting upon the opposite longitudinal edge regions of the web. As can be seen in FIG. 2, the links of the chains of the entrainers 14, 16, each have at least one tooth 18 which penetrates into the web 12, so that the latter is firmly gripped at the said edge regions by the respective pair of entrainers whereby the width and length of the web are kept constant. At the same time, the web 12 is heated up to at least 100° C. by means of heat radiators 20 directed against the opposite faces of the web and placed between the pairs of entrainers, whereby the web thickness increases and its density correspondingly decreases for the reasons already explained hereinbefore. At the exit from the entrainers the web 12 passes between groups of quick-cooling fans 21 and then it meets a pair of trimmer knives, one of which is marked 22 in FIG. 1, which trim the web to the required width (e.g. 130 cm.), already before lamination; the cuttings 24 thus obtained are therefore free from paper and can therefore be sent for remelting.

For all the remainder of its travel the web 12 is entrained by a pair of rollers 26, which are rubber covered.

Marked 28 and 30 are shown two feeder rolls of Kraft paper, from which a strip of paper 32, 34, respectively is led to the respective face of the web 12 of foamed polystyrene. Each of the two strips of paper, of a width of 130 cm., runs on an arcuate shield, 36 and 38 respectively, of sheet metal, heated to, say, 170° C. by electrical resistances 40 placed on the inside of the shield. The two shields converge towards the foamed web 12 at a tangent in the direction of travel of the latter and end in pressure feet 36A, 38A (see FIG. 3) situated facing each other. The pressure feet are flat and parallel to the foamed web 12, and the two shields 36, 38 are movable by adjustment towards the web 12 to provide a lamination zone L in which the strips of paper 32, 34, preheated to 170° C. are pressed by the pressure feet against the faces of the web 12 being at about ambient temperature. Because of this latter temperature, the cellular membranes of the web 12 are relatively rigid, which makes it possible to effect lamination at a relatively lively pressure, thereby to achieve good adhesion of the strips of paper to the foamed web without a permanent distortion of the cellular structure of the latter. Typically, the pressure feet 36A, 38A compress the web 12 by not more than about 25% of its thickness.

Figure 3:
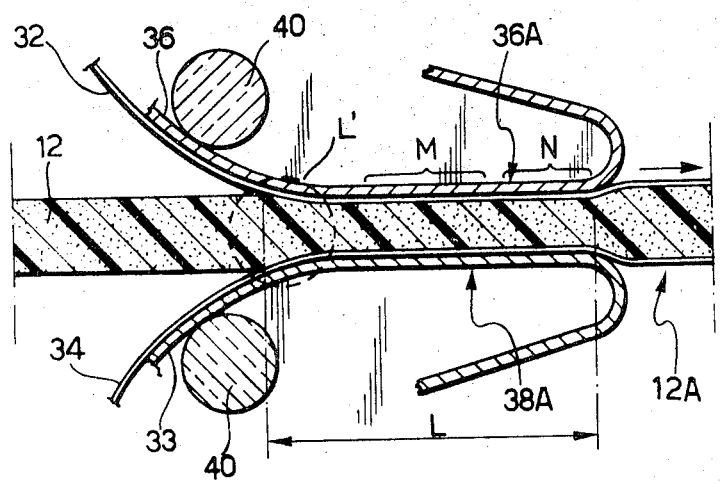

In the lamination zone L each strip of paper 32, 34 produces a superficial fusion of the foam web 12 with consequent reciprocal bonding. The last pair of resistances 40, visible in FIG. 3, is placed to heat the shields 36, 38 at 170° C. at a region shortly ahead of the lamination zone L, in an arrangement whereby the foamed web 12 meets the paper strips at their preheating temperature of 170° C. while at the same time the pressure feet are kept relatively hot merely because they constitute a continuation of the respective shields 36, 38. If necessary, the heat inflow to the feet may be reduced by providing a heat-insulating insert (not shown) between each of the pressure feet and its respective shield at a location immediately downstream the "meeting region" L', or the feet may be cooled by transversely blowing therethrough streams of air, thereby to lower their temperature to the desired extent (advantageously between 80° C. and 40° C., assuming the softening point of the polystyrene foam is at about 100–110° C.). In the arrangement shown in FIG. 3 the temperature of the pressure feet progressively sinks in the direction of travel of the laminate, similarly as sinks the temperature of the paper strips due to their contact with relatively cool foam web 12. In FIG. 3, it may be assumed that a length such as M of each of the pressing feet is at a temperature below the melting point of the foam resin, while a subsequent length N is at a temperature below the softening point of the resin. Thus, the pressure feet extend the pressure contact of the sheets and web, while preventing at the same time a substantial heat dispersion from the exposed faces of the paper strips without adducing to the foam web amounts of heat capable of softening the foam. In a laminate obtained in this manner the bond is so strong that the paper strips cannot be separated from the foam web without tearing.

It is self-evident that the function of the shields 36, 38 may be accomplished by one or more pairs of heating rolls, the last pair being arranged to provide a nip establishing the meeting region L' and being immediately followed by at least a further pair of moderately heated rolls accomplishing the function of the pressure feet 36A, 38A as contact-pressure extending means and heat-screening means.

The length of the lamination zone L in the direction of travel is a function of the fall in temperature of the strips of paper consequent upon contact with the foam web 12, or of the surface fusion of the said web. This means that, once the fused film is solidified, with which of course there corresponds a certain length of travel of the laminate, the function of the pressure feet ceases, and it is therefore useless to prolong them more than necessary. Given that the speed of travel can very within wide limits (typically from 3 to 6 m./min. and more), the length of the zone L can be expressed, simply, in units of time, from a minimum of 1 sec. up to a maximum of about 5 secs.

At the exit of zone L is placed a pair of rollers 42, which can be heated and which between them form a calibrated passage of a width which is less than the thickness of the laminate 12a coming out of the zone L to anneal the bond between the components 12, 32, 34. The laminate thus calendered may be heated by infra-red radiators 44, thereby to induce a further expansion of the foam web 12 with corresponding increase in thickness of the said web whilst the laminate 12A is kept stretched by the traction exerted by the rollers 26 above mentioned. It is obvious that with the aforesaid further expansion one obtains a corresponding reduction in the specific weight of the laminate. The so post-expanded laminate is then passed between a pair of rollers 46, intensely cooled on the inside by water fed through the connector tubes 48, thereby to consolidate the bonds.

A final calibration is carried out by means of a pair of calibrator rollers 50, to each of which there is associated a fan 52 for final cooling of the laminate being calibrated. Finally, the laminate is cut into sheets of the desired length by means of a cutting device 54 placed behind the fans.

I claim:
1. Method of continuously laminating a web of rigid, closed-cell foam of thermoplastic resin with a flexible backing sheet comprising:
 feeding to a lamination zone the foam web at a temperature at which the foam is rigid;
 co-currently feeding to said zone the said sheet while accumulating in the latter at a pre-heating temperature exceeding the melting point of the resin an amount of heat sufficient to superficially melt the web in pressure contact with the sheet;
 pressing together the web and pre-heated sheet in a meeting region of the two in the lamination zone by means of a pressing member in said region heated at a temperature substantially equal to the pre-heating temperature of the sheet while passing the sheet and web through said meeting region relatively high linear speed preventing the pressing member to perceptibly heat the foam web through the sheet in said region, whereby the foam web face in contact with the sheet is fused by the heat accumulated in the sheet and sticks to the latter; continuing or repeating pressing of the sheet against the web while the said face of the foam web is in its sticky condition and while substantially preventing heat dispersion from the exposed face of the sheet till the web-to-sheet bond is set; and cooling the obtained laminate;
 the step of preventing heat dispersion from the exposed face of the sheet being effected by pressing the latter against the web by means of a heated surface having a temperature below the melting point of the foam resin.

2. Method of continuously laminating a web of rigid, closed-cell foam of thermoplastic resin with a flexible backing sheet comprising; feeding to a lamination zone the foam web at a temperature at which the foam is rigid;
 co-currently feeding to said zone the said sheet while accumulating in the latter at a pre-heating temperature exceeding the melting point of the resin an amount of heat sufficient to superficially melt the web in pressure contact with the sheet;
 pressing together the web and pre-heated sheet in a meeting region of the two in the lamination zone by means of a pressing member in said region heated at a temperature substantially equal to the pre-heating temperature of the sheet while passing the sheet and web through said meeting region at a relatively high linear speed preventing the pressing member to perceptibly heat the foam web through the sheet in said region, whereby the foam web face in contact with the sheet is fused by the heat accumulated in the sheet and sticks to the latter;
 continuing or repeating pressing of the sheet against the web while the said face of the foam web is in its sticky condition and while substantially preventing heat dispersion from the exposed face of the sheet till the web-to-sheet bond is set; and cooling the obtained laminate;
 the step of preventing heat dispersion from the exposed face of the sheet being effected by pressing the latter against the web by means of a first heated surface having a temperature below the melting point of the foam resin, and a subsequent heated surface having a temperature below the softening point of the resin.

References Cited
UNITED STATES PATENTS

| | | | |
|---|---|---|---|
| 3,062,698 | 11/1962 | Aykanian | 156—306 |
| 3,637,458 | 1/1972 | Parrish | 161—160 |
| 3,269,882 | 8/1966 | Willy | 156—78 |

WILLIAM A. POWELL, Primary Examiner

B. J. LEITTEN, Assistant Examiner

U.S. Cl. X.R.

156—309, 498, 499, 555; 161—159

UNITED STATES PATENT OFFICE
CERTIFICATE OF CORRECTION

Patent No. 3,823,047                Dated July 9, 1974

Inventor(s) Roberto Colombo

It is certified that error appears in the above-identified patent and that said Letters Patent are hereby corrected as shown below:

IN THE HEADING:

Priority Application No. Incorrect. Should be:
--Application No. 69687-A/71--

Signed and sealed this 5th day of november 1974.

(SEAL)
Attest:

McCOY M. GIBSON JR.
Attesting Officer

C. MARSHALL DANN
Commissioner of Patents